United States Patent
Rao et al.

(10) Patent No.: US 12,345,401 B2
(45) Date of Patent: Jul. 1, 2025

(54) SMART LANDING LIGHT DEICING USING ADVANCED TRANSPARENT METAL MESH CONDUCTOR

(71) Applicant: GOODRICH LIGHTING SYSTEMS, INC., Phoenix, AZ (US)

(72) Inventors: Sreekanth Koti Ananda Rao, Bangalore (IN); Petchi Subramanian, Bangalore (IN); Chana Kesava Reddy, Bengaluru (IN); Ashish Kumar Agarwal, Bangalore (IN)

(73) Assignee: GOODRICH LIGHTING SYSTEMS, INC., Phoenix, AZ (US)

( * ) Notice: Subject to any disclaimer, the term of this patent is extended or adjusted under 35 U.S.C. 154(b) by 429 days.

(21) Appl. No.: 17/850,175

(22) Filed: Jun. 27, 2022

(65) Prior Publication Data
US 2023/0220983 A1  Jul. 13, 2023

(30) Foreign Application Priority Data
Jan. 10, 2022  (IN) .............................. 202241001235

(51) Int. Cl.
*F21V 29/90* (2015.01)
*B64D 15/12* (2006.01)
*B64D 47/04* (2006.01)

(52) U.S. Cl.
CPC .............. *F21V 29/90* (2015.01); *B64D 15/12* (2013.01); *B64D 47/04* (2013.01)

(58) Field of Classification Search
CPC ................................ B64D 15/12; F21V 29/90
See application file for complete search history.

(56) References Cited

U.S. PATENT DOCUMENTS 2,773,162 A * 12/1956 Christensen ........... B64D 15/14
219/203
4,782,331 A   11/1988 Martens
(Continued)

FOREIGN PATENT DOCUMENTS

AU   2019204176   4/2021
CN   102518996    6/2012
(Continued)

OTHER PUBLICATIONS

European Patent Office, European Search Report dated May 26, 2023 in Application No. 23150170.1.
European Patent Office, European Office Action dated Nov. 19, 2024 in Application No. 23150170.1.

*Primary Examiner* — Zheng Song
(74) *Attorney, Agent, or Firm* — SNELL & WILMER L.L.P.

(57) ABSTRACT

Systems and methods for deicing an aircraft landing light may include a metal mesh conductor coupled to a lens of a landing light. The systems and methods may include a power supply, a temperature sensor, a deicing control unit, an aircraft light having a lens, and a mesh coupled to the lens. The temperature sensor may be a microwave resonator sensor configured to sense the temperature of the landing light and send signals to the deicing control unit. The signals may be configured to instruct the deicing control unit to either apply an electric current to the mesh, or cease applying an electric current to the mesh, depending on the landing light temperatures. The deicing control unit may receive landing pulses from a flight control system. The pulses may indicate that the aircraft is landing or has landed.

16 Claims, 6 Drawing Sheets

(56) References Cited

U.S. PATENT DOCUMENTS

| | | |
|---|---|---|
| 4,851,817 A | 7/1989 | Brossia et al. |
| 5,484,121 A | 1/1996 | Padawer |
| 5,500,530 A | 3/1996 | Gregoris |
| 5,528,287 A | 6/1996 | Stern |
| 5,534,708 A | 7/1996 | Ellinger et al. |
| 5,760,711 A | 6/1998 | Burns |
| 8,011,818 B2 | 9/2011 | Negley |
| 8,258,444 B2 | 9/2012 | Ohtani et al. |
| 9,302,452 B2 | 4/2016 | Uprety et al. |
| 2013/0114279 A1* | 5/2013 | Marley ................. F21S 41/153 362/516 |
| 2013/0249375 A1* | 9/2013 | Panagotacos ........... F21V 5/007 313/15 |
| 2016/0273754 A1* | 9/2016 | Gongola ................. F21V 29/90 |
| 2016/0363286 A1* | 12/2016 | Deering .................. H05B 3/84 |
| 2019/0017676 A1* | 1/2019 | Van Straten .......... F21S 41/141 |
| 2020/0180562 A1 | 6/2020 | Uprety et al. |
| 2021/0086903 A1 | 3/2021 | Cueto-Gomez |
| 2023/0235872 A1* | 7/2023 | Rivas .................... F21S 41/148 |
| 2023/0264656 A1* | 8/2023 | Chaudhari ........... B60Q 1/0005 219/202 |

FOREIGN PATENT DOCUMENTS

| | | |
|---|---|---|
| CN | 110939890 | 3/2020 |
| CN | 111981427 | 11/2020 |
| EP | 0079645 | 8/1985 |
| EP | 405625 | 1/1991 |
| EP | 0663592 | 12/2002 |
| EP | 1466827 | 10/2004 |
| EP | 3015764 | 5/2016 |
| EP | 3060478 | 9/2018 |
| EP | 4173965 | 5/2023 |
| JP | 2000006252 | 1/2000 |
| KR | 102206748 | 1/2021 |
| WO | 1995012523 | 5/1995 |

\* cited by examiner

SMART LANDING LIGHT DEICING USING ADVANCED TRANSPARENT METAL MESH CONDUCTOR

CROSS-REFERENCE TO RELATED APPLICATIONS

This application claims priority to, and the benefit of, India Patent Application No. 202241001235, filed Jan. 10, 2022 (DAS Code A15A) and titled "SMART LANDING LIGHT DEICING USING ADVANCED TRANSPARENT METAL MESH CONDUCTOR," which is incorporated by reference herein in its entirety for all purposes.

FIELD

The present disclosure relates generally to aircraft landing systems, and, more specifically, to aircraft landing light systems

BACKGROUND

Aircraft typically employ external landing lights used during takeoff, landing, and taxiing for the purpose of illuminating an area around the aircraft for visibility. It is advantageous to illuminate the runway during takeoff, landing, and taxiing, especially during nighttime operations. Moreover, landing lights may be utilized as a collision avoidance measure against other aircraft and bird strikes. Landing lights may include incandescent lamps, halogen lamps, and/or light-emitting diode (LED) lamps, which may be susceptible to icing at high altitudes, resulting in reduced light output and pilot visibility. Poor visibility may increase the difficulty of safely operating an aircraft.

SUMMARY

An aircraft landing light system is disclosed herein. In various embodiments, the aircraft landing light system may comprise a temperature sensor, a deicing control unit, and a landing light. In various embodiments, the temperature sensor may be configured to send a first signal. In various embodiments, the deicing control unit may be coupled to the temperature sensor. The deicing control unit may be configured to receive the first signal from the temperature sensor.

In various embodiments, the landing light may comprise a housing having an outer ring. In various embodiments, the landing light may comprise at least on light bulb disposed within the housing. The landing light may comprise a lens. In various embodiments, the lens may be enclosed by the outer ring of the housing. In various embodiments, the mesh may be coupled to the lens. In various embodiments, the mesh may be coupled to the deicing control unit. In various embodiments, the mesh may be configured to heat the lens.

In various embodiments, the mesh may be a nano-metal mesh. The nano-metal mesh may comprise a plurality of wires arranged in a gird. In various embodiments, the plurality of wired may be fixed within a thin film. In various embodiments, the plurality of wires may define a plurality of pores. In various embodiments, the nano-metal mesh may be coupled to the lens by an adhesive. In various embodiments, the nano-metal mesh may be configured to heat the lens by resistive heating. In various embodiments, the nano-metal mesh may comprise a resistance of at least 2 ohms. In various embodiments, the system may further comprise a power supply. In various embodiments, the power supply may be coupled to the temperature sensor, the deicing control unit, and the mesh.

In various embodiments, the temperature sensor may be a microwave resonator sensor. In various embodiments, the microwave resonator sensor may be configured to sense a frequency response variation, wherein the frequency response variation may be associated with one of a first temperature within a first predetermined temperature range and a second temperature within a second predetermined temperature range. The microwave resonator sensor may be configured to send the first signal to the deicing control unit after sensing the first temperature. In various embodiments, the first signal may be configured to instruct the deicing control unit to apply an electric current to the mesh. In various embodiments, the deicing control unit may be configured to apply the electric current to the mesh.

An aircraft landing light system is also disclosed herein. In various embodiments, the system may comprise a temperature sensor, a deicing control unit, and a landing light. In various embodiments, the temperature sensor may be configured to send a first signal. In various embodiments, the deicing control unit may be coupled to the temperature sensor. The deicing control unit may be configured to receive the first signal from the temperature sensor. In various embodiments, the deicing control unit may be further configured to receive a first landing pulse from a flight control system.

In various embodiments, the landing light may comprise a housing having an outer ring. The landing light may comprise a lens. In various embodiments, the lens may be enclosed by the outer ring of the housing. In various embodiments, the mesh may be coupled to the lens. In various embodiments, the mesh may be further coupled to the deicing control unit. In various embodiments, the mesh may be configured to heat the lens.

In various embodiments, the mesh may be a nano-metal mesh. The nano-metal mesh may comprise a plurality of wires arranged in a gird. In various embodiments, the plurality of wired may be fixed within a thin film. In various embodiments, the plurality of wires may define a plurality of pores. In various embodiments, the nano-metal mesh may be coupled to the lens by an adhesive. In various embodiments, the nano-metal mesh may be configured to heat the lens by resistive heating. In various embodiments, the nano-metal mesh may comprise a resistance of at least 2 ohms.

In various embodiments, the landing light may comprise at least on light bulb disposed within the housing. In various embodiments, the system may further comprise a power supply. In various embodiments, the power supply may be coupled to the temperature sensor, the deicing control unit, and the mesh. The mesh may be coupled to the power supply by a first lead. The deicing control unit may be coupled to the power supply by a second lead.

In various embodiments, the temperature sensor may be a microwave resonator sensor. In various embodiments, the microwave resonator sensor may be configured to sense a frequency response variation, wherein the frequency response variation may be associated with one of a first temperature within a first predetermined temperature range and a second temperature within a second predetermined temperature range. In various embodiments, the first predetermined temperature range may comprise temperatures of less than 80 degrees Celsius. In various embodiments, the second predetermined temperature range may comprise temperatures of at least 80 degrees Celsius. In various embodiments, the microwave resonator sensor may be configured to send the first signal to the deicing control unit after sensing the first temperature. The first signal may be configured to instruct the deicing control unit to apply an electric current to the mesh. In various embodiments, the deicing control unit may be configured to apply the electric current to the mesh in response to receiving the first signal from the microwave resonator sensor and the first landing pulse from the flight control system.

In various embodiments, the microwave resonator sensor may be further configured to send a second signal to the deicing control unit after sensing the second temperature. In various embodiments, the deicing control unit may be configured to receive the second signal from the microwave resonator sensor. The second signal may be configured to instruct the deicing control unit to cease applying the electric current to the mesh.

In various embodiments, the deicing control unit may be configured to receive a second landing pulse from the flight control system. The deicing control unit may be configured to cease applying the electric current to the mesh in response to receiving the second signal from the microwave resonator sensor and the second landing pulse from the flight control system.

A method of deicing an aircraft landing system is also disclosed herein. In various embodiments, the method may comprise receiving, by a deicing control unit, a first signal from a temperature sensor. In various embodiments, the deicing control unit may be coupled to a temperature sensor. The temperature sensor may be configured to sense a frequency response variation, wherein the frequency response variation may be associated with one of a first temperature within a first predetermined temperature range and a second temperature within a second predetermined temperature range. The temperature sensor may be configured to send a first signal to the deicing control unit after sensing the first temperature. The first signal may be configured to instruct the deicing control unit to apply an electric current to the mesh. In various embodiments, the mesh may be coupled to a lens of a landing light. The mesh may be in electrical communication with a power supply. The mesh may be further coupled to the deicing control unit. In various embodiments, the method may further comprise obtaining, by the deicing control unit, a first pulse from a flight control system. The method may further comprise commanding, by the deicing control unit, a power supply to supply the electric current to the mesh in response to receiving the first signal and obtaining the first pulse. In various embodiments, the mesh may be configured to heat the lens.

In various embodiments, the receiving may further comprise the temperature sensor wherein the temperature sensor may be configured to send a second signal to the deicing control unit after sensing the second temperature. In various embodiments, the deicing control unit may be configured to receive the second signal from the temperature sensor. The second signal may be configured to instruct the deicing control unit to cease applying the electric current to the mesh.

In various embodiments, the obtaining may further comprise the deicing control unit, wherein the deicing control unit may be configured to obtain a second landing pulse from the flight control system. In various embodiments, the deicing control unit may be configured to cease applying the electric current to the mesh in response to receiving the second signal from the temperature sensor and the second landing pulse from the flight control system.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

The present disclosure relates to aircraft light systems, specifically light emitting diode (LED) based light systems for external aircraft lighting, and to retrofitting existing external aircraft light assemblies without significant redesign of the mounting space, wiring, or control systems for the lighting. LED, incandescent, or halogen parabolic aluminized reflector (PAR) lamps used for conventional aircraft headlights may be mounted to the wings and/or landing gear of the aircraft. Referring to landing lights and takeoff lights as an example, an aircraft may employ a total of four incandescent PAR lamps for this purpose. Two of the incandescent PAR lamps may operate as landing lights, and the other two of the incandescent PAR lamps may operate as takeoff lights. The present disclosure relates to systems and methods for deicing a lens of a lighting assembly by utilizing a mesh, for example, a conductive mesh, coupled to the lens, while, in various embodiments, still allowing the lighting systems sufficient light output (luminous flux) and light intensity (luminous intensity) for a given power input.

Figure 1:
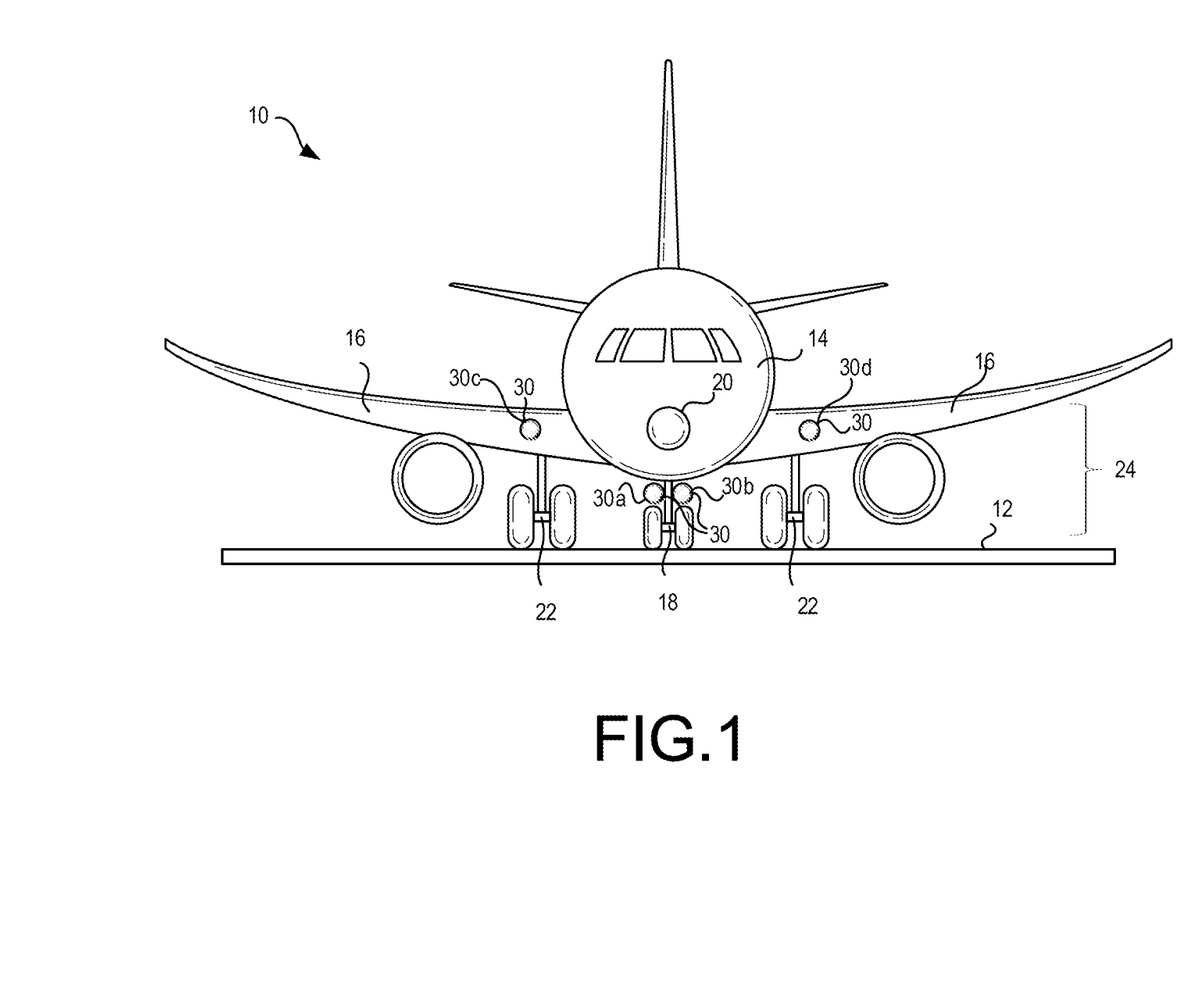
FIG. 1 illustrates an aircraft with eternal aircraft light systems, in accordance with various embodiments.

With reference to FIG. 1, an aircraft 10 on runway 12 is shown in a front view, in accordance with various embodiments. Aircraft 10 may comprise a fuselage 14, which may be coupled to and/or comprise a pair of wings 16. Aircraft 10 may comprise a nose landing gear 18 located under the nose 20 of aircraft 10, and may further comprise a right and left landing gear 22. A light system 24 of aircraft 10 may comprise a plurality of lamps 30, which may comprise exterior or external aircraft lights that illuminate areas around the aircraft 10 while the aircraft 10 is on the ground or in flight. Light system 24 may include LED lamps 30a, 30b, 30c, 30d, which may collectively be referred to as LED lamps 30. In various embodiments, LED lamp 30a and LED lamp 30b may both be mounted to nose landing gear 18. LED lamp 30c and LED lamp 30d may each be mounted to a wing 16, such as on the wing roots or on the front edges of the wings 16. LED lamps 30 may operate as a takeoff lights, landing lights, taxi lights and/or a runway turnoff light. As illustrated in FIG. 1, for example, LED lamps 30 are multi-beam light assemblies configured to operate as takeoff lights and landing lights.

Figure 2:
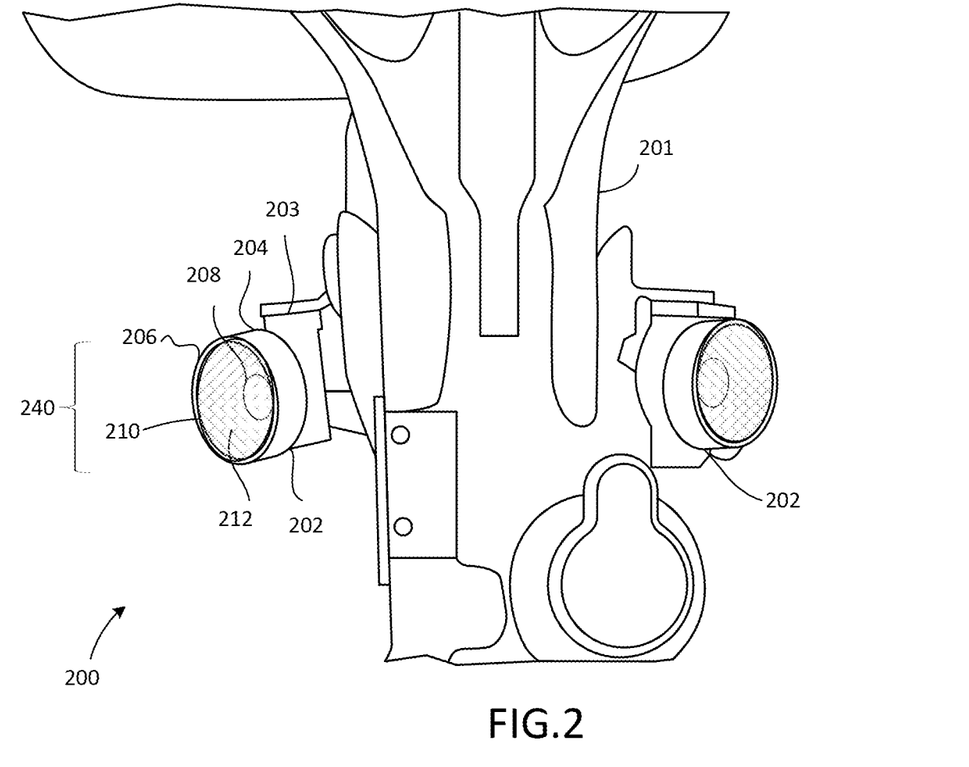
FIG. 2 illustrates external aircraft light systems, specifically, landing gear light systems, in accordance with various embodiments.

Referring to FIG. 2, an aircraft landing light assembly 200 is shown, specifically, an aircraft landing light 202 attached to a landing gear 201. The landing gear 201 may comprise a plurality of landing lights 202 utilized for taxiing, take-off, or landing the aircraft. As shown, the landing light 202 may comprise a housing 204 having an outer ring 206. The housing 204 may be of any suitable geometry, such as, for example, a circle, oval, rectangle, square, and the like. The housing 204 may be comprised of any thermoplastic, metal, thermoplastic composite, and the like, suitable for withstanding the external ambient and atmospheric conditions of aircraft travel. In various embodiments, at least one bulb 208 may be disposed within the housing 204. The housing 204 may be configured to house a single incandescent or halogen PAR bulb. In various embodiments, the housing 204 may be configured to house one of more LED bulbs.

In various embodiments, and as shown, the outer ring 206 may circumscribe the circumference of the housing 204. The outer ring 206 may be configured to enclose a lens 210 within the housing 204, protecting the bulb 208 from external conditions in the environment. The lens 210 may be comprised of any suitable glass, crystal (e.g., sapphire), thermoplastic such as, for example, high-grade acrylic glass, acrylic, acrylic plexiglass, polycarbonate, and the like, or thermoplastic composite material. The lens 210 may comprise a partially spherical shape or may be planar. For example, the lens 210 may be convex (bulging away from the bulb 208), concave (depressed towards the bulb 208), or planar (flat). In various embodiments, the lens 210 may be of any suitable material and shape to maximize luminous flux and luminous intensity.

In various embodiments, the landing light 202 may further comprise a conductive mesh 212 coupled to the lens 210 (i.e., the mesh-lens assembly 240). As shown, the mesh 212 may be an advanced, substantially transparent metal mesh coupled to the lens 210. The mesh 212 may be configured to cover a portion of the lens 210 or the entire lens 210. As will be discussed further below, the mesh 212 may be coupled to additional components of the aircraft light assembly 200 that enable the mesh 212 to conduct an electric current, and thus, provide heat to the lens 210.

Figures 3A, 3B, 3C, 3D, 3E:
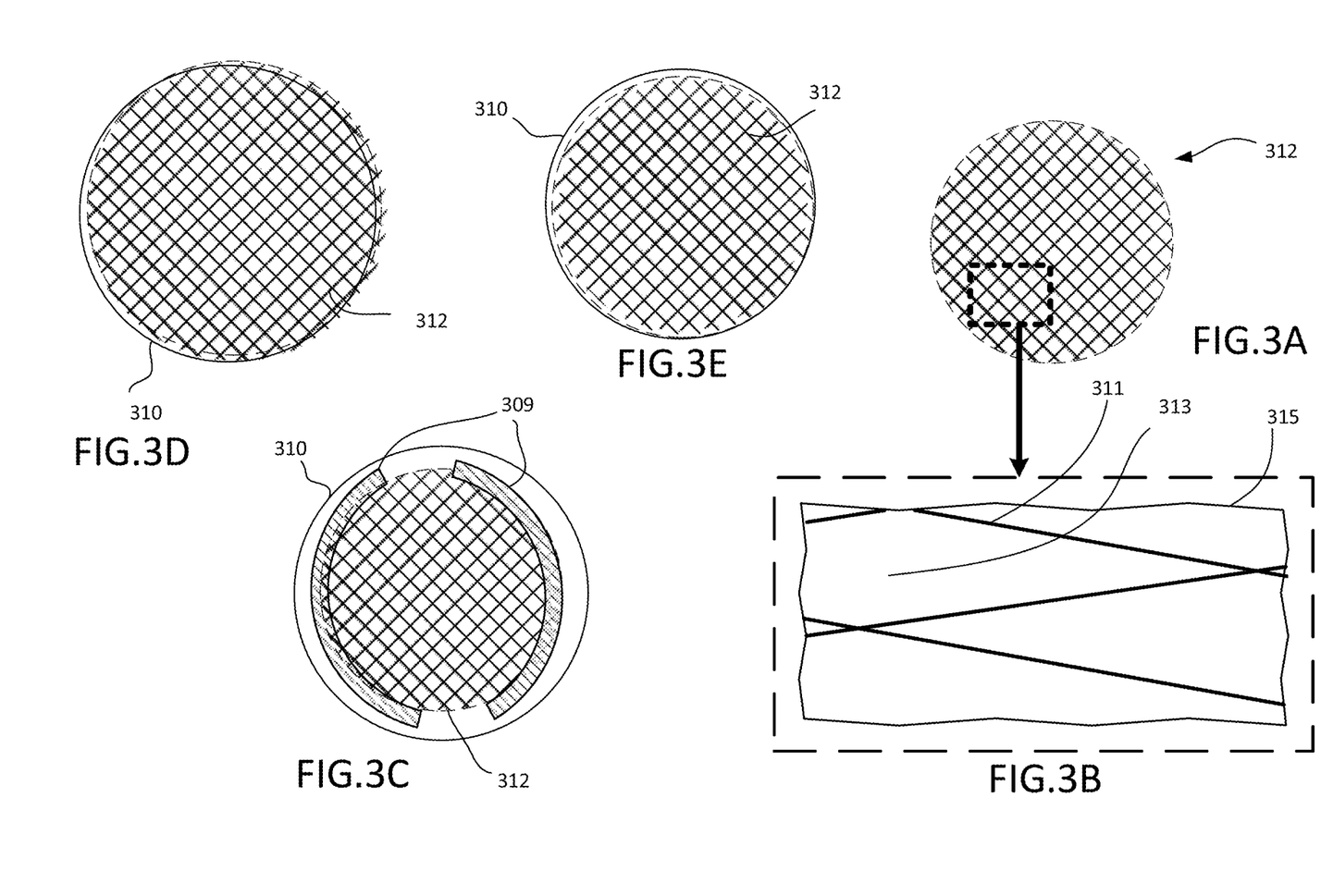
FIG. 3A illustrates a mesh, in accordance with various embodiments.
FIG. 3B illustrates a portion of the mesh of FIG. 3A.
FIG. 3C illustrates a mesh coupled to a lens of an aircraft light system, in accordance with various embodiments.
FIG. 3D illustrates a mesh overlaying a lens of an aircraft light system, in accordance with various embodiments.
FIG. 3E illustrates a mesh on the inside of a lens, in accordance with various embodiments.

In continued reference to FIG. 2, and in further reference to FIGS. 3A-3E, the mesh 212 is shown in accordance with various embodiments. The mesh 212 may be coupled to the lens 210. For example, in various embodiments, the mesh 212 may be overlayed onto the lens 210 by an adhesive 309. In various embodiments, the adhesive 309 may be insulating. As shown in FIG. 3C, the adhesive 309 may cover a portion of the lens 310 and mesh 312. In various embodiments, the adhesive may circumscribe the lens 310 and mesh 312. In various embodiments, the mesh 212 may be laminated to the lens 210 (e.g., laminated into layers in a laminar configuration, such as in polymeric lens), embedded in the lens 210 (e.g., coextruded or formed within a glass or crystal lens), disposed on the inside of the lens (as shown in FIG. 3E), or mechanically fixed to the lens 210 by a fastener or any other attachment mechanism suitable for promoting contact between the mesh 212 and the lens 210.

The mesh 312 may be an advanced, substantially transparent nano-metal mesh. The transparent nano-metal mesh may comprise a plurality of wires 311 arranged in a grid-like fashion and fixed within a thin film 315, such as, for example, graphene. The thickness of each wire may be, for example, between 10 nanometers (nm) to 100 nm, 101 nm to 500 nm, or 501 nm to 1000 nm (1 micrometer). Each wire may be fixed within the thin film 315 such that the wires 311 do not overlap, allowing the film 315 to remain flexible and durable enough to be bent, folded, or thermoformed without comprising conductive integrity or transmissivity to visible light. Each wire may comprise any suitable conductive material, such as, for example, aluminum, iron, steel, silver, copper, platinum, gold, nickel, alloys of the aforementioned, and/or composite materials having embedded conductors.

In various embodiments, the plurality of wires 311 may define a plurality of pores 313. The pores 313 may be of any suitable geometric shape when viewed in cross section, such as, for example, a circle, square, rectangle, hexagon, rhombus, parallelogram, and the like. The pores 313 may have diameters (where pores 313 are circular in cross section) and/or diagonal lengths (where pores 313 are quadrilaterals) of less than 200 nm, between 200 nm and 500 nm, 500 nm to 1 micrometer, between 1 micrometer and 1.5 micrometers, and 1.5 micrometers and 5 micrometers. In various embodiments, the mesh 312 itself may range from at least 1 square inch (6.45 square centimeters) to 5 square inches (32.26 square centimeters), 5 square inches (32.26 square centimeters) to 15 square inches (96.78 square centimeters), or 15 square inches (96.78 square centimeters) to 20 square inches (129.1 square centimeters).

Compared to a lighting assembly without a mesh, in various embodiments, the presently described mesh-lens assembly 240 may enable between 95%-96%, 96.1%-98%, or 98.1%-99.99% visible light transmission through a surface of the mesh-lens assembly 240. Accordingly, compared to the visible light transmittance of a lighting assembly without a mesh, which theoretically would yield 100% visible light transmissivity, the mesh-lens assembly 240 may enable substantial transparency between 0.95-0.96 visible transmittance (VT), 0.961-0.98 VT, or 0.981-0.9999 VT.

In various embodiments, the metal mesh 312 may be an electrical conductor. In various embodiments, and as will be discussed further below, the metal mesh 212, 312 coupled to the lens 210 may be supplied with electricity, and may be configured to conduct an electric current, heating the lens 210 by resistive heating. Resistive heating involves passing an electric current through a conductor to produce heat. The heat generated by an electrical conductor, such as the mesh 312, is proportional to the product of its resistance and the square of the electric current.

It may be desirable to heat the lens 210 of an aircraft landing light 202 where the lens has been exposed to low temperatures in the ambient environment. Exposure to low temperatures may cause ice to form on the mesh-lens assembly 240. Ice formation may be especially prominent on surfaces perpendicular to the direction of plane motion. Ice formation across the lens 210 may be undesirable since ice may block or diminish luminous flux and luminous intensity of the landing light 202, reducing pilot visibility. By coupling the mesh 212 to the lens 210 of the landing light, and thus heating the lens by resistive heating, ice formed across the lens 210 may melt. To minimize energy consumption and maximize heating, it may be desirable to choose a mesh 212 comprising a resistance of at least 2 ohms. Considering, for example, a lens having a 148-millimeter (0.485-foot (Ft.)) surface diameter, the resistivity of the mesh 212 may be 1 ohm/Ft. In various embodiments, the mesh 212 may comprise a resistance between 2-4 ohms, 4-10 ohms, 10-20 ohms, or 20-40 ohms. In short, the lower the resistance, the more electric current that may be drawn by the mesh 212 to heat the lens 210. Accordingly, the lower the resistance, the less electric current that must be applied to the mesh 212 in order to heat the lens 210.

Figure 4:
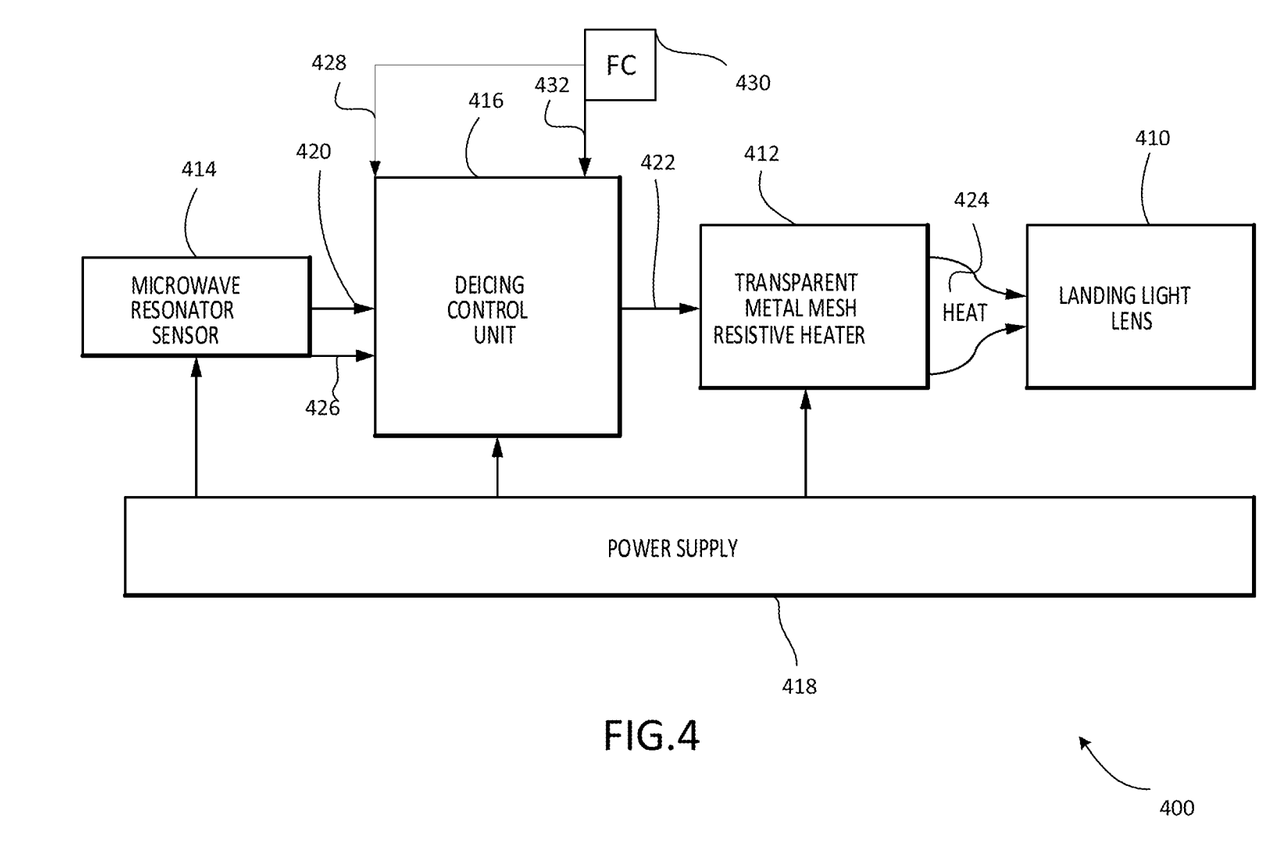
FIG. 4 illustrates a schematic of an aircraft landing light system, in accordance with various embodiments.

Referring now to FIG. 4, a schematic of an aircraft landing light system 400 is shown. In various embodiments, the system may comprise a temperature sensor, which may be for example, a microwave resonator sensor 414. With additional reference to FIG. 2, the microwave resonator sensor 414 may be disposed proximal the landing light 202 and may be coupled to a power supply 418. In various embodiments, the microwave resonator sensor 414 may be disposed within the housing 204. The microwave resonator sensor 414 may be configured to sense ice formation on a lens 410 based on temperature. For example, where the temperature of the mesh-lens assembly 240 is below 80 degrees Celsius, or where ice has formed on the lens 410 at a temperature at or below 0 degrees Celsius, the microwave resonator sensor 414 may sense a frequency response variation. This frequency response variation may be associated with a first temperature within a first predetermined temperature range. The first temperature range may comprise temperatures of less than 80 degrees Celsius.

The microwave resonator sensor 414 may be configured to sense the first temperature, and in response, send a first signal 420 to a deicing control unit 416 coupled to the microwave resonator sensor 414. The deicing control unit 416 may be configured to receive the first signal from the microwave resonator sensor 414. In various embodiments, the first signal 420 may be configured to instruct the deicing control unit 416 to apply an electric current 422 to the mesh 412. The deicing control unit 416 may be configured to apply the electric current 422 to the mesh 412 in response to receiving the first signal 420 from the microwave resonator sensor 414. In conducting the electric current by resistive heating, the mesh 412 may heat 424 the landing light lens 410. Accordingly, the microwave resonator sensor 414 may selectively send a signal to the deicing control unit 416 and enable selectively timed electrical conduction of the mesh 412 (i.e., in response to need for deicing or in response to temperature parameters being met). As temperature changes, the microwave resonator sensor 414 recognizes the need to deice.

In various embodiments, the deicing control unit 416 may be located proximal the landing light 202 and may be coupled to the power supply 418. In various embodiments, the mesh 412 may be coupled to the deicing control unit 416. The mesh 412 may be further coupled to the power supply 418. In various embodiments, the mesh 412 may be coupled to the power supply 418 by a first lead, or in any way suitable for connecting the mesh 412 to the power supply 418. The mesh 412 may be coupled to the deicing control unit 416 by a second lead, or in any way suitable for applying an electric current 422 to the mesh 412. In various embodiments, and with additional reference to FIG. 2, the power supply 418 may be coupled to the mesh 212 by coupling to the housing 204 of the landing light 202, which may include at least one power ends configured to connect to the power supply 418.

With continued reference to FIG. 4, in accordance with various embodiments, an aircraft landing light system 400 may comprise a deicing control unit 416 configured to receive a first landing pulse 428 from a flight control system 430. The first landing pulse 428 may be configured to inform the deicing control unit 416 about the operational status of the aircraft (i.e., at cruising altitude, taking off, landing, taxiing/on the ground). Specifically, the first landing pulse 428 may inform the deicing control unit 416 that the plane is reducing altitude and is in the process of landing. In various embodiments, the deicing control unit 416 may be configured to apply the electric current 422 to the mesh 412 in response to receiving the first signal 420 from the microwave resonator sensor and the first landing pulse 428 from the flight control system 430. Accordingly, the deicing control unit 416 may apply the electric current 422 to the mesh 412 in response to the microwave resonator sensor 414 sensing ice formation at a stage of a flight when the landing light 202 may be most needed (i.e., on approach to landing). This may reduce energy consumption caused by resistive heating and may further enable selective and smart heating of the landing light lens 410. Moreover, to tend to minimize energy consumption and maximize deicing prior to the aircraft's 10 approach to the runway 12, it may be desirable for the deicing control unit 416 to apply the electric current 422 between 16 minutes (min) and 20 min, 20 min and 30 min, 30 min and 40 min, or 40 min-1 hour before landing.

In further reference to FIG. 4, in various embodiments, the microwave resonator sensor 414 may be further configured to sense a frequency response variation associated with a second temperature within a second predetermined temperature range. In various embodiments, the second predetermined temperature range may comprise temperatures of at least 80 degrees Celsius. The second predetermined temperature range may comprise temperatures that indicate a potential lack of ice formation on the lens 410. Accordingly, the microwave resonator sensor 414 may be configured to send a second signal 426 to the deicing control unit 416 after sensing the second temperature. The deicing control unit 416 may be configured to receive the second signal 426. In various embodiments, the second signal 426 may be configured to instruct the deicing control unit to cease applying the electric current 422 to the mesh 412. Accordingly, the deicing control unit 416 may be configured to selectively turn on or off based on the temperatures sensed by the microwave resonator sensor 414, reducing power consumption and enabling a closed feedback loop of smart temperature regulation of the landing light lens 410.

In various embodiments, the deicing control unit 416 may be configured to receive a second landing pulse 432 from the flight control system 430. The second landing pulse 432 may be configured to inform the deicing control unit 416 about the operational status of the aircraft (i.e., at cruising altitude, taking off, landing, taxiing/on the ground). Specifically, the second landing pulse 432 may inform the deicing control unit 416 that the plane has landed (i.e., on the ground and/or taxiing on the ground). The deicing control unit may be configured to cease applying the electric current 422 to the mesh 412 in response to receiving the second signal 426 from the microwave resonator sensor 414 and the second landing pulse 432 from the flight control system 430. Accordingly, the aircraft landing light system 400 may operate within a closed loop feedback system. The deicing control unit 416 may not apply the electric current 422 to the mesh 412 when the microwave resonator sensor 414 no longer senses ice formation at a stage of a flight when the landing light 202 may be least useful to the pilot for safe operation of the aircraft 10 (i.e., on the ground). This may reduce energy consumption caused by resistive heating and may further enable selective and smart heating of the landing light lens 410.

Figure 5A:
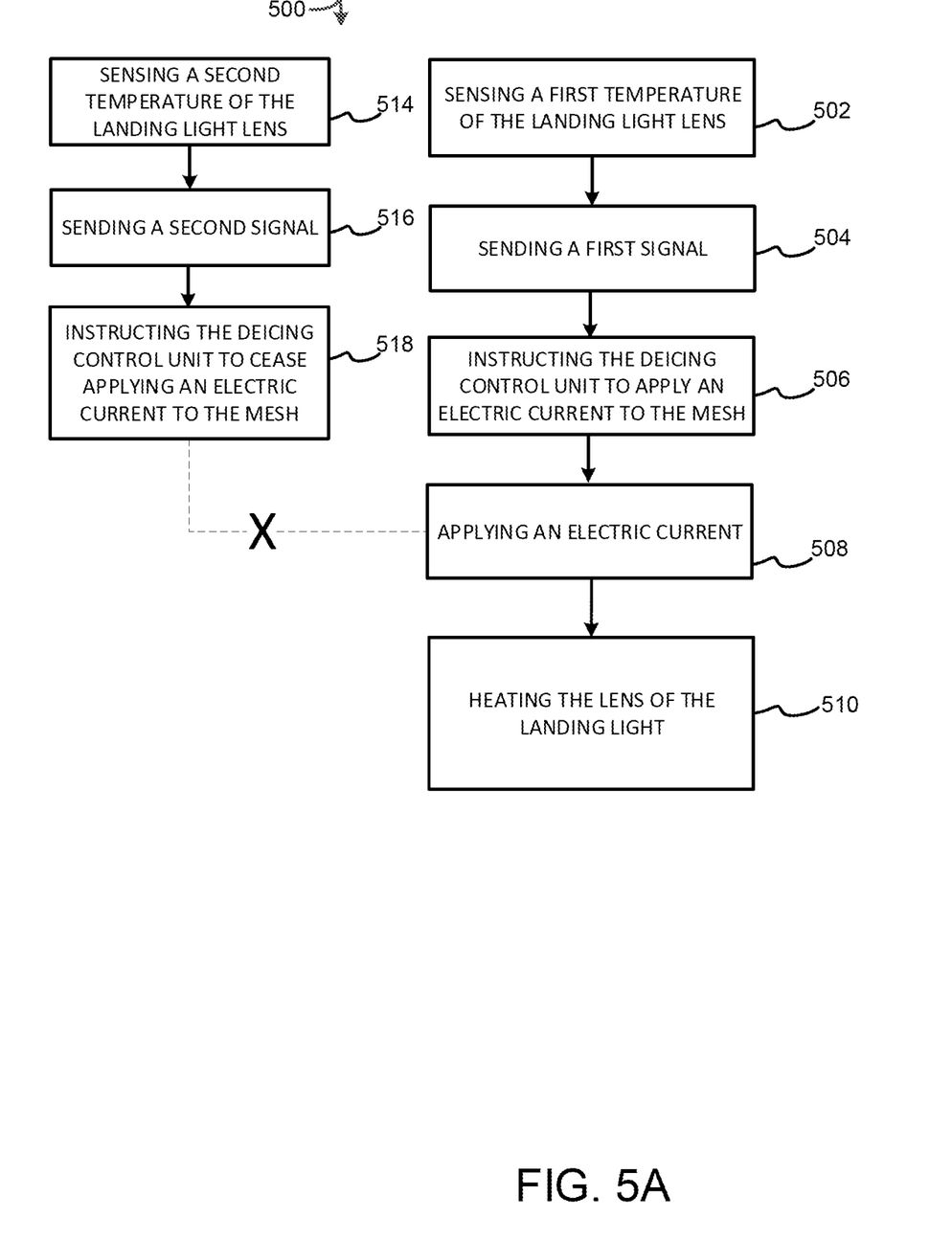
FIGS. 5A-5B illustrate methods of deicing an aircraft landing light system, in accordance with various embodiments.
Figure 5B:
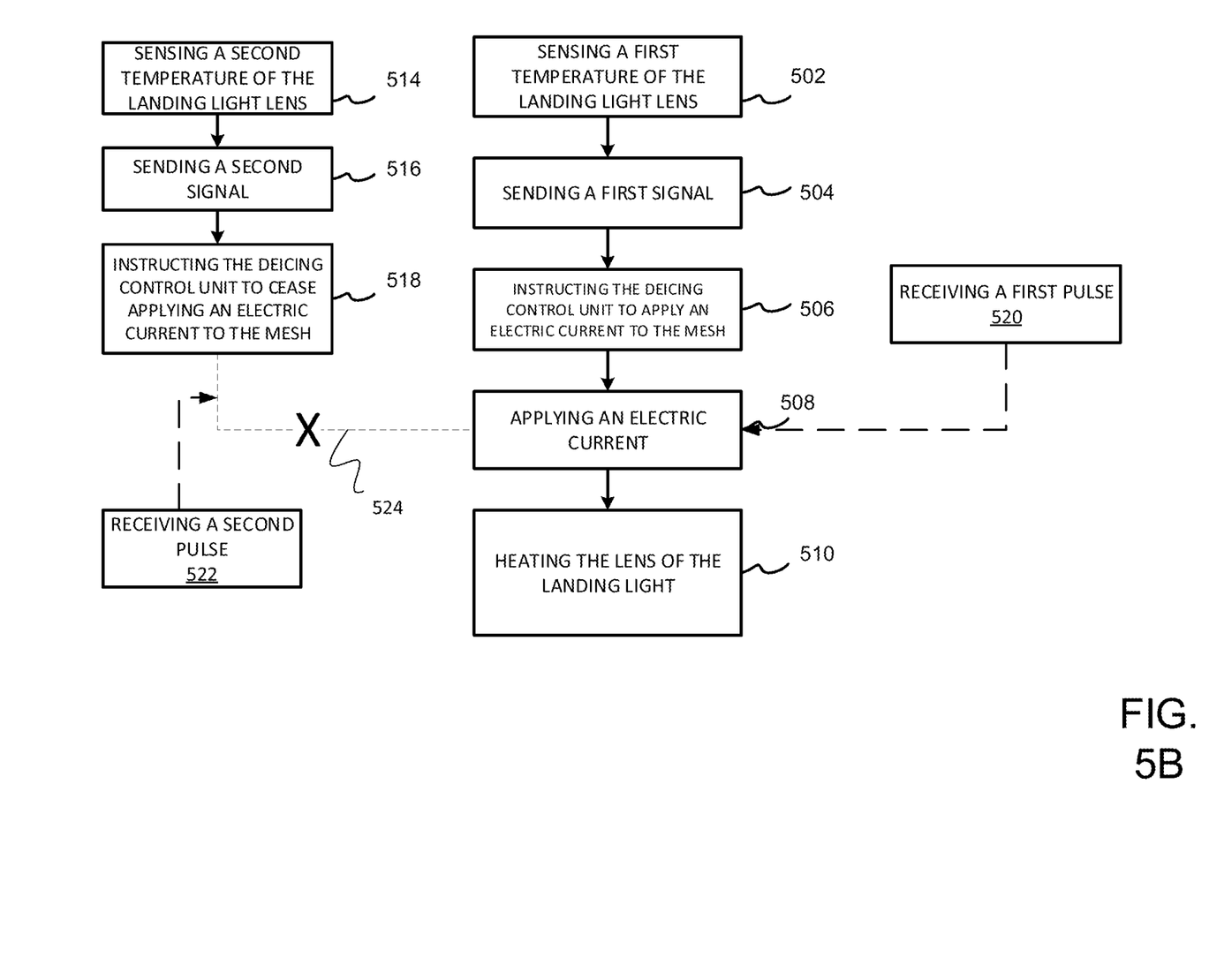

Referring to FIGS. 5A-B, and with further reference to FIG. 4, a method (step 500) of deicing an aircraft landing light system 400 is shown in accordance with various embodiments. In various embodiments, the method may comprise receiving (step 506), by a deicing control unit 416, a first signal from temperature sensor, which may be a microwave resonator sensor 414. The method may further comprise obtaining (step 520), by a deicing control unit 416, a first pulse from 428 from a flight control system. The method may further comprise commanding (step 508), by the deicing control unit 416, a power supply 418 to supply an electric current to a mesh 412 in response to receiving (step 506) the first signal 420 and obtaining (step 520) the first landing pulse 428.

In various embodiments, the mesh 412 may be coupled to the landing light lens 410. The mesh may be electrically coupled to the power supply 418. The mesh 412 may be further coupled to the deicing control unit 416. The temperature sensor 414 may be configured to sense (step 502) a frequency response variation associated with a first temperature within a first predetermined temperature range. The temperature sensor 414 may be configured to send (step 504) a first signal 420 to the deicing control unit 416 after sensing the first temperature. The first signal 420 may be configured to instruct the deicing control unit 416 to apply an electric current 422 to the mesh 412.

In various embodiments, the receiving (step 506) may further comprise the temperature sensor 414 wherein the temperature sensor 414 may be configured to sense (step 514) a frequency response variation associated with a second temperature within a second predetermined temperature range. In various embodiments, the temperature sensor 414 may be configured to send (step 516) a second signal 426 to the deicing control unit 416 after sensing the second temperature. In various embodiments, the deicing control unit 416 may be configured to receive the second signal 426 from the temperature sensor 414. The second signal 426 may be configured to instruct (step 518) the deicing control unit to cease applying the electric current to the mesh.

In various embodiments, the obtaining (step 520) may further comprise the deicing control unit 416 wherein the deicing control unit 416 may be configured to obtain (step 522) a second landing pulse 432 from the flight control system 430. In various embodiments, the deicing control unit 416 may be configured to cease (step 524) applying the electric current 422 to the mesh 412 in response to receiving the second signal 426 from the temperature sensor 414 and obtaining (step 522) the second landing pulse 432 from the flight control system 430.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft landing light system, the system comprising:
    a temperature sensor, wherein the temperature sensor is configured to send a first signal;
    a deicing control unit coupled to the temperature sensor, wherein the deicing control unit is configured to receive the first signal from the temperature sensor; and
    a landing light, wherein the landing light further comprises:

a housing having an outer ring;

a lens, wherein the lens is enclosed by the outer ring of the housing; and a nano-metal mesh coupled to the lens and comprising a plurality of wires arranged in a grid and fixed within a thin film, wherein the plurality of wires defines a plurality of pores each having a cross-section length of less than 5 micrometers, wherein the nano-metal mesh is coupled to the deicing control unit, wherein the nano-metal mesh is configured to heat the lens.

2. The system of claim 1, wherein the nano-metal mesh is coupled to the lens by an adhesive.

3. The system of claim 2, wherein the nano-metal mesh is configured to heat the lens by resistive heating, wherein the nano-metal mesh comprises a resistance of at least 2 ohms.

4. The system of claim 1, wherein the temperature sensor is a microwave resonator sensor, wherein the microwave resonator sensor is configured to sense a frequency response variation, wherein the frequency response variation is associated with at least one of a first temperature within a first predetermined temperature range and a second temperature within a second predetermined temperature range.

5. The system of claim 4, wherein the microwave resonator sensor is configured to send the first signal to the deicing control unit after sensing the first temperature, wherein the first signal is configured to instruct the deicing control unit to apply an electric current to the nano-metal mesh, wherein the deicing control unit is configured to apply the electric current to the nano-metal mesh.

6. The system of claim 1, wherein the landing light further comprises at least one bulb disposed within the housing.

7. The system of claim 1, further comprising a power supply, wherein the power supply is coupled to the temperature sensor, the deicing control unit, and the nano-metal mesh.

8. An aircraft landing light system, the system comprising:

a temperature sensor, wherein the temperature sensor is configured to send a first signal;

a deicing control unit coupled to the temperature sensor, wherein the deicing control unit is configured to receive the first signal from the temperature sensor, wherein the deicing control unit is further configured to receive a first landing pulse from a flight control system; and a landing light, wherein the landing light further comprises:

a housing having an outer ring;

a lens, wherein the lens is enclosed by the outer ring of the housing; and a nano-metal mesh coupled to the lens and comprising a plurality of wires arranged in a grid and fixed within a thin film, wherein the plurality of wires defines a plurality of pores each having a cross-section length of less than 5 micrometers, wherein the nano-metal mesh is coupled to the deicing control unit, wherein the nano-metal mesh is configured to heat the lens.

9. The system of claim 8, wherein the temperature sensor is a microwave resonator sensor, wherein the microwave resonator sensor is configured to sense a frequency response variation, wherein the frequency response variation is associated with at least one of a first temperature within a first predetermined temperature range and a second temperature within a second predetermined temperature range.

10. The system of claim 9, wherein the first predetermined temperature range comprises temperatures of less than 80 degrees Celsius, wherein the second predetermined temperature range comprises temperatures of at least 80 degrees Celsius.

11. The system of claim 10, wherein the microwave resonator sensor is configured to send the first signal to the deicing control unit after sensing the first temperature, wherein the first signal is configured to instruct the deicing control unit to apply an electric current to the nano-metal mesh, wherein the deicing control unit is configured to apply the electric current to the nano-metal mesh in response to receiving the first signal from the microwave resonator sensor and the first landing pulse from the flight control system.

12. The system of claim 11, wherein the microwave resonator sensor is further configured to send a second signal to the deicing control unit after sensing the second temperature, wherein the deicing control unit is configured to receive the second signal from the microwave resonator sensor, wherein the second signal is configured to instruct the deicing control unit to cease applying the electric current to the nano-metal mesh.

13. The system of claim 12, wherein the deicing control unit is configured to receive a second landing pulse from the flight control system, wherein the deicing control unit is configured to cease applying the electric current to the nano-metal mesh in response to receiving the second signal from the microwave resonator sensor and the second landing pulse from the flight control system.

14. The system of claim 8, wherein the nano-metal mesh is coupled to the lens by an adhesive.

15. The system of claim 14, wherein the nano-metal mesh is configured to heat the lens by resistive heating, wherein the nano-metal mesh comprises a resistance of at least 2 ohms.

16. The system of claim 8, wherein the landing light further comprises at least one bulb disposed within the housing, wherein the system further comprises a power supply, wherein the power supply is coupled to the temperature sensor, the deicing control unit, and the nano-metal mesh, wherein the nano-metal mesh is coupled to the power supply by a first lead, wherein the nano-metal mesh is coupled to the deicing control unit by a second lead.

* * * * *